No. 895,554. PATENTED AUG. 11, 1908.
A. GRAFF.
VEHICLE WHEEL.
APPLICATION FILED APR. 16, 1906.
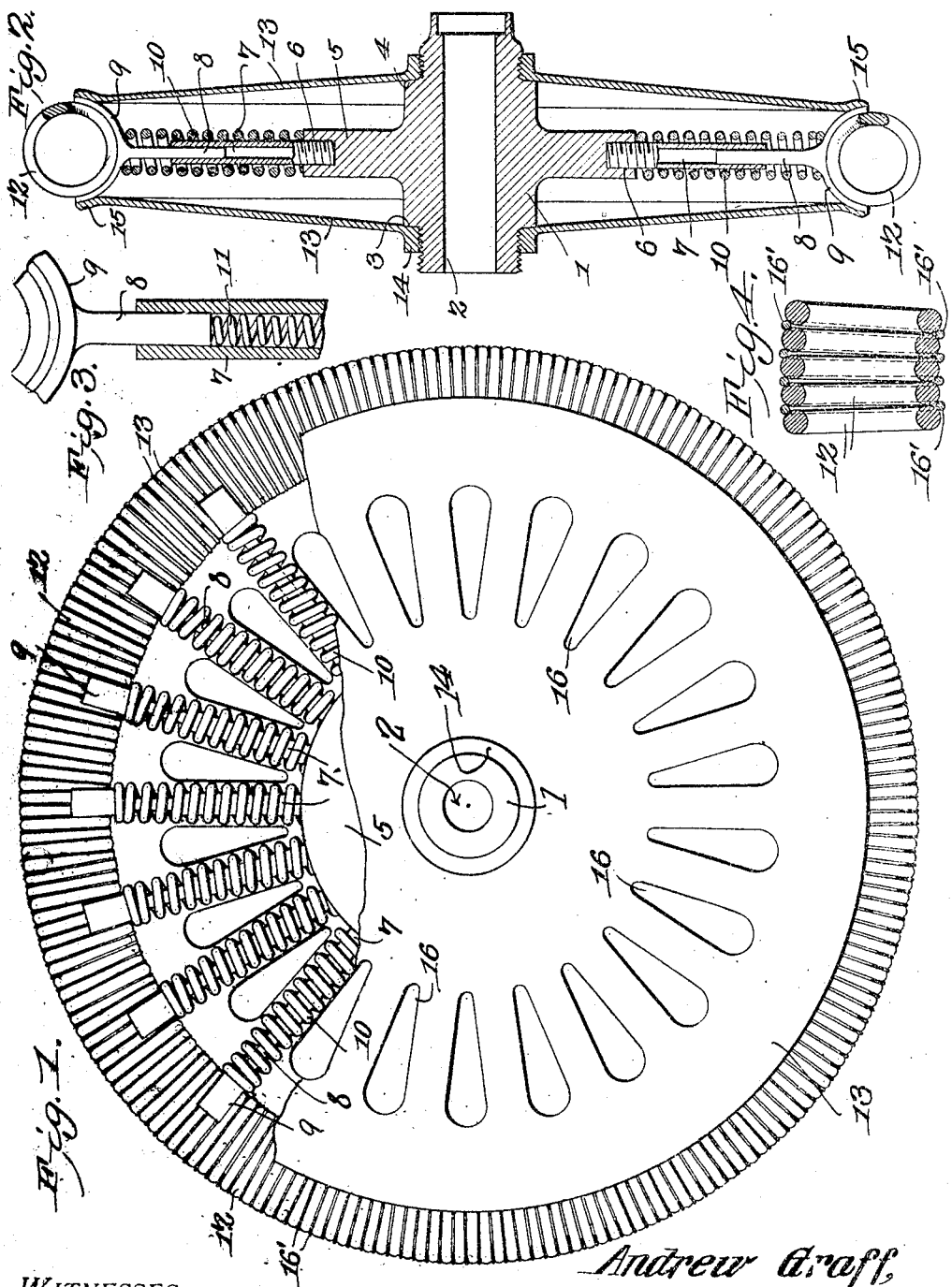

UNITED STATES PATENT OFFICE.

ANDREW GRAFF, OF WELLINGTON, KANSAS.

VEHICLE-WHEEL.

No. 895,554.　　　　　Specification of Letters Patent.　　　Patented Aug. 11, 1908.

Application filed April 16, 1906. Serial No. 312,027.

*To all whom it may concern:*

Be it known that I, ANDREW GRAFF, a citizen of the United States, residing at Wellington, in the county of Sumner and State of Kansas, have invented a new and useful Vehicle-Wheel, of which the following is a specification.

This invention relates to vehicle wheels, and has for its object to provide for cushioning the same in a new and novel manner, whereby pneumatic and other puncturable tires are dispensed with, and the desired yielding qualities are preserved.

A further object of the invention is to provide an improved rim which of itself also constitutes a tire and is yieldable, and it is also proposed to support the rim by means of elastically yieldable spokes to supplement the yieldable qualities of the rim.

With these and other objects in view, the present invention consists in the combination and arrangement of parts as will be hereinafter more fully described, shown in the accompanying drawing and particularly pointed out in the appended claims, it being understood that changes in the form, proportion, size and minor details may be made, within the scope of the claims without departing from the spirit or sacrificing any of the advantages of the invention.

In the drawing: Figure 1 is a side elevation of a vehicle wheel embodying the features of the present invention, one of the shields being broken away to disclose several of the spokes. Fig. 2 is a cross sectional view of the wheel. Fig. 3 is a detail fragmentary perspective view of a modified form of spoke. Fig. 4 is a detail sectional view of the rim of the wheel.

Like characters of reference designate corresponding parts in all of the figures of the drawing.

The present wheel includes a hub 1 having the usual bore or spindle opening 2. The opposite ends of the hub are slightly reduced in diameter so as to provide external annular shoulders 3 and 4, and midway between these shoulders is an external annular flange 5 integral with the hub. At regular intervals, the outer periphery of the flange is provided with sockets 6, which are preferably threaded for the reception of a threaded spoke member 7, as in Figs. 1 and 2. This spoke member is tubular and telescopically receives another spoke member 8 which is provided upon its outer end with a yoke or fork 9 disposed transversely to the wheel and designed to form a seat for the rim. A helical spring 10 embraces the spoke and bears in opposite directions against the flange 5 and the seat or yoke 9, thereby to yieldably maintain the outer spoke member at its outer limit.

A modified arrangement of spoke has been shown in Fig. 3, wherein a helical spring 11 is disposed within the tubular spoke member 7 so as to bear against the inner end of the latter and against the inner end of the spoke member 8, whereby the spring is housed in a very effective and convenient manner without requiring any alteration in the assemblage of the spoke members.

The rim of the wheel consists of a wire helix 12 of cold drawn wire, having its coils or whirls circular in form and lying in contact with one another, said rim being received within the seats or yokes 9, whereby the rim is yieldably supported by the yieldable spokes.

At each side of the wheel there is a metallic shield 13 which is provided with a concentric internally threaded hub portion 14 screwed upon the adjacent threaded end of the hub and set up tightly against the adjacent shoulder 3 or 4, the shield being in the form of a yieldable disk of such a diameter as to have its outer flared peripheral portion 15 bear against the adjacent ends of the seats and the helical rim to maintain the rim centered upon the wheel, and also to form a brace to take lateral strains from the spokes. It will of course be understood that there is no positive connection between each shield or brace and the rim, as it is necessary to have the rim yield radially and it must therefore be independent of the braces. To reduce weight, it is proposed to provide each shield member with radial slots 16 which terminate short of the outer edge of the shield in order that the latter may not be weakened throughout that portion which engages the adjacent side of the rim. The disks or shields 13 are, of course, yieldable outward in order to permit inward movement of the yoke-like ends of the spoke sections.

It will now be understood that the rim is of itself yieldable independently of the yieldable spokes, and by reason of its ribbed tread portion, it has a firm grip upon the roadway and is therefore not liable to slip or skid on smooth roadways and when turning out of a straight path.

The bending of the wire helix from its original straight condition in the form of a circle, of course slightly separates the whirls of the helix throughout the tread portion of the rim, and as such openings will permit mud and the like to work into the interior of the rim, it is proposed to close such openings, and this is accomplished by winding a wire 16' of small gage around the rim and in the grooves or channels provided between the whirls of the rim.

Having thus described the invention, what is claimed is:

1. A vehicle wheel having a helical rim which is wrapped with a small gage wire fitted in the spiral channel formed between the whirls of the helix.

2. A combined rim and tire for vehicles consisting of a wire helix bent into circular form and having a wire of small gage wound thereon in the spiral channel formed between the whirls of the helix.

3. A vehicle wheel comprising a hub, telescopic spokes, a rim carried by the spokes, and disk braces fitted upon the ends of the hub and bearing against opposite sides of the rim.

4. A vehicle wheel comprising a hub, spring pressed telescopic spokes, a helical rim carried by the spokes, and disk braces carried by opposite ends of the hub and bearing against adjacent sides of the rim.

In testimony that I claim the foregoing as my own, I have hereto affixed my signature in the presence of two witnesses.

ANDREW GRAFF.

Witnesses:
W. H. BURKS,
C. B. LAMBE.